(12) United States Patent
Li (10) Patent No.: US 11,662,530 B2
(45) Date of Patent: May 30, 2023

(54) COMPOSITE-TYPE OUTDOOR CONNECTOR

(71) Applicant: Huizhou Fibercan Industrial Co., LTD, Huizhou (CN)

(72) Inventor: Yaole Li, Huizhou (CN)

(73) Assignee: Huizhou Fibercan Industrial Co., LTD, Huizhou (CN)

( * ) Notice: Subject to any disclaimer, the term of this patent is extended or adjusted under 35 U.S.C. 154(b) by 0 days.

(21) Appl. No.: 17/501,334

(22) Filed: Oct. 14, 2021

(65) Prior Publication Data

US 2023/0070900 A1    Mar. 9, 2023

(30) Foreign Application Priority Data

Sep. 9, 2021  (CN) .......................... 202111057376.2

(51) Int. Cl.
*G02B 6/38*  (2006.01)

(52) U.S. Cl.
CPC ........... *G02B 6/3849* (2013.01); *G02B 6/381* (2013.01); *G02B 6/3887* (2013.01)

(58) Field of Classification Search
CPC ..... G02B 6/3849; G02B 6/381; G02B 6/3887
See application file for complete search history.

(56) References Cited

U.S. PATENT DOCUMENTS

| 9,077,099 | B1* | 7/2015 | Hatcher | G02B 6/3816 |
| 10,663,674 | B1* | 5/2020 | Zhu | G02B 6/3825 |
| 2018/0372962 | A1* | 12/2018 | Isenhour | G02B 6/3825 |
| 2020/0174203 | A1* | 6/2020 | De Jong | G02B 6/3893 |
| 2021/0041634 | A1* | 2/2021 | Jensen | G02B 6/3846 |
| 2022/0225423 | A1* | 7/2022 | Zhang | H04W 74/006 |

FOREIGN PATENT DOCUMENTS

JP            2022534198 A  *  7/2022  ........... G02B 6/3849

\* cited by examiner

*Primary Examiner* — Eric Wong
(74) *Attorney, Agent, or Firm* — Morgan, Lewis & Bockius LLP (57) ABSTRACT

Disclosed is a composite-type outdoor connector, which includes a dustproof sleeve and a connecting sleeve, the dustproof sleeve includes a dustproof head sleeve and a connecting nut, the dustproof head sleeve and the connecting nut are screwed and fixed, and the connecting sleeve includes a connecting head sleeve and a connecting tail sleeve, a connecting component is provided in the middle of the connecting sleeve, the connecting component includes a protective sleeve, a connector, a fixing member, a stop ring and a ferrule, the beneficial effects of the present disclosure are that the optical fiber connection is more stable, the structure is more stable, and the cable is not easy to rotate and deviate, and different types of connectors can be connected by replacing different connecting head sleeves, thereby having better compatibility.

7 Claims, 10 Drawing Sheets

COMPOSITE-TYPE OUTDOOR CONNECTOR

TECHNICAL FIELD

The disclosure relates to the technical field of optical communication, and more particularly, to a composite-type outdoor connector.

BACKGROUND

The optical fiber connector is a device for detachable connection between optical fibers. The optical fiber connector precisely connects the two end faces of the optical fibers so that the light energy output by the transmitting fiber can be coupled to the receiving fiber to the maximum extent. To a certain extent, the optical fiber connector affects the reliability and performance of the optical transmission system.

After the existing outdoor optical fiber connector is installed, the core wire is easy to rotate along the circumference of the shaft, thus the axial positioning effect of the optical fiber connection is poor, the quality of butting of the fiber core is poor, and the reliability is low. In use, the connector needs to be plugged into the connecting device to achieve a connection effect, and different connecting devices need to use different connectors, thus the compatibility is insufficient.

SUMMARY

Aiming at the technical defects existing in the existing technology, the present disclosure proposes a composite-type outdoor connector, which addresses the above technical problems and meets actual needs. The specific technical schemes are as follows:

A composite-type outdoor connector, which includes a dustproof sleeve and a connecting sleeve, the dustproof sleeve includes a dustproof head sleeve and a connecting nut, the dustproof head sleeve and the connecting nut are screwed and fixed, and the connecting sleeve includes a connecting head sleeve and a connecting tail sleeve, a connecting component is provided in the middle of the connecting sleeve, the connecting component includes a protective sleeve, a connector, a fixing member, a stop ring and a ferrule;

the protective sleeve is sleeved on an end of the ferrule, the ferrule is inserted at a front end of the stop ring, a bottom end of the stop ring is inserted into a front end of the fixing member, a front end of the fixing member is inserted into a bottom end of the connector, first clamping slots are provided at both sides adjacent to the bottom end of the connector, first clamping blocks are provided on both sides adjacent to the front end of the fixing member at a position corresponding to the first clamping slot, a plurality of second clamping slots are provided at equal intervals around the stop ring, and second clamping blocks are provided on the inner walls on both sides of the connector, the second clamping block is clamped in the second clamping slot, and a top end of the ferrule protrudes from the top end of the connector;

third clamping slots are provided on both sides adjacent to a top end of the connecting tail sleeve, the top end of the connecting tail sleeve is inserted into a bottom end of the connecting head sleeve, third clamping blocks are provided at a position corresponding to the third clamping slot at the bottom end of the connecting head sleeve, a through hole is provided in the middle of the connecting tail sleeve, and an optical cable is passed through the through hole, an optical cable fixing ring is provided in the optical cable corresponding to the through hole, the optical cable passes through the connecting tail sleeve, the connecting head sleeve and the fixing member in sequence, and then is connected to a bottom end of the ferrule.

As an improvement of the above scheme, a connecting handle is provided between the dustproof head sleeve and the connecting tail sleeve, one end of the connecting handle is connected to a position adjacent to a top end of the dustproof head sleeve, the other end of the connecting handle is connected to a position adjacent to a bottom end of the connecting tail sleeve, and the dustproof sleeve is connected to a bottom end of the dust head sleeve.

As an improvement of the above scheme, an outer end surface adjacent to a bottom end of the dustproof head sleeve is provided with a fourth clamping slot, and an inner end surface adjacent to a top end of the connecting nut is provided with a fourth clamping point, the fourth clamping point is rotatably clamped in the fourth clamping slot, a first sealing ring is provided adjacent to the bottom end of the dustproof head sleeve and corresponding to an upper side of the fourth clamping slot.

As an improvement of the above scheme, an internal thread is provided on the inner end surface adjacent to the bottom end of the dustproof head sleeve, and an external thread is provided on the outer end surface adjacent to the top end of the connecting nut, the top end of the connecting nut is rotatably fixed to the bottom end of the dustproof head sleeve, the external thread at the top end of the connecting nut and the internal thread at the bottom end of the dustproof head sleeve are engaged with each other, and a second sealing ring is provided adjacent to the top end of the connecting nut and corresponding to an upper side of the external thread.

As an improvement of the above scheme, a first groove is provided at a tail end of the connecting tail sleeve, a second groove is provided adjacent to a front end of the connecting tail sleeve, the second groove is provided with a third sealing ring, a mounting groove with the same shape as a bottom end of the fixing member is provided at the front end of the connecting tail sleeve, a fifth clamping point is provided on both sides of the fixing member, and a fifth clamping slot is provided in the mounting groove at a position corresponding to the fifth clamping point.

As an improvement of the above scheme, the third clamping slots are symmetrically arranged on the outer end surfaces on both sides adjacent to the top end of the connecting tail sleeve, a vertical downward opening is provided at the top end of the connecting tail sleeve corresponding to an upper side of the third clamping slot, a vertically downward first clamping groove and a second clamping groove are provided at the top end of the connecting tail sleeve, the first clamping groove and the second clamping groove are symmetrically arranged on the top end of the connecting tail sleeve, and a groove width dimension of the first clamping groove is larger than that of the second clamping groove.

As an improvement of the above scheme, the third clamping blocks are symmetrically arranged on both sides of the bottom end of the connecting head sleeve, a vertical first limiting block and a vertical second limiting block are provided at positions of an inner end surface of the bottom end of the connecting head sleeve corresponding to the first clamping groove and the second clamping groove, a vertically downward opening slot is provided at a top end of the connecting head sleeve, and a connection position between two sides of a top end of the opening slot and the top end of the connecting head sleeve is arc-shaped.

As an improvement of the above scheme, the third clamping blocks are symmetrically arranged on both sides of the bottom end of the connecting head sleeve, a vertical first limiting block and a vertical second limiting block are provided at positions of an inner end surface of the bottom end of the connecting head sleeve corresponding to the first clamping groove and the second clamping groove, and a vertically upward inserting block is provided on a top end of the connecting head sleeve.

The beneficial effects of the present disclosure are: the first clamping block on the fixing member is clamped in the first clamping slot on the connector, so that the connection between the fixing member and the connector is closer, the second clamping slot at the top end of the stop ring is clamped with the second clamping block in the connector, so that the stop ring does not move in a circle in the connector, and the stability of the ferrule is improved. The third clamping block at the bottom end of the connecting head sleeve is clamped in the third clamping slot at the top end of the connecting tail sleeve, which plays a role of stable connection. When the third clamping block is connected to the third clamping slot, the first clamping groove and the second clamping groove are connected and fixed to the first limiting block and the second limiting block, respectively, making the connection between the connecting tail sleeve and the connecting head sleeve more stable, and therefore, even if the connecting tail sleeve does not produce rotational deviation, it can be connected to different types of connectors by replacing different connecting head sleeves, thereby having a better compatibility. An optical cable fixing ring is arranged in the connecting tail sleeve, and the optical cable fixing ring is sleeved on the optical cable. By passing the optical cable through the optical cable fixing ring and fixing it in the connecting tail sleeve, it has a more stable effect. The dustproof head sleeve and the connecting nut are screwed and fixed, so that the connector can avoid contact with dust when not in use.

In which:
10 dustproof sleeve;
11 dustproof head sleeve;
111 fourth clamping slot;
112 internal thread;
12 connecting nut;
121 fourth clamping point;
122 external thread;
20 connecting sleeve;
21 connecting head sleeve;
211 third clamping block;
212 first limiting block;
213 second limiting block;
214 opening slot;
215 inserting block;
22 connecting tail sleeve;
221 third clamping slot 221;
222 through hole 222;
223 first groove;
224 mounting groove;
225 fifth clamping slot;
226 opening;
227 first clamping groove;
228 second clamping groove;
229 second groove;
30 connecting component;
31 protective sleeve;
32 connector;
321 first clamping slot;
322 second clamping block;
33 fixing member;
331 first clamping block;
332 fifth clamping point 332;
34 stop ring 34;
341 second clamping slot;
35 ferrule;
40 optical cable 40;
401 optical cable fixing ring;
50 connecting handle;
60 first sealing ring;
70 second sealing ring;
80 third sealing ring.

DETAILED DESCRIPTION

The following describes the implementation of the present disclosure with reference to the accompanying drawings and related embodiments. It should be pointed out that the following related examples are only preferred examples for better describing the present disclosure itself, and the implementation of the present disclosure is not limited to the following examples. In addition, the present disclosure relates to related necessary components in the technical field, and those related necessary components should be regarded as a well-known technology in the technical field, which can be known and mastered by those skilled in the technical field.

As shown in FIG. 1 to FIG. 19, a composite-type outdoor connector, which includes a dustproof sleeve 10 and a connecting sleeve 20, the dustproof sleeve 10 includes a dustproof head sleeve 11 and a connecting nut 12, the dustproof head sleeve 11 and the connecting nut 12 are screwed and fixed, and the connecting sleeve 20 includes a connecting head sleeve 21 and a connecting tail sleeve 22, a connecting component 30 is provided in the middle of the connecting sleeve 20, the connecting component 30 includes a protective sleeve 31, a connector 32, a fixing member 33, a stop ring 34 and a ferrule 35;

the protective sleeve 31 is sleeved on an end of the ferrule 35, the ferrule 35 is inserted at a front end of the stop ring 34, a bottom end of the stop ring 34 is inserted into a front end of the fixing member 33, a front end of the fixing member 33 is inserted into a bottom end of the connector 32, first clamping slots 321 are provided at both sides adjacent to the bottom end of the connector 32, first clamping blocks 331 are provided on both sides adjacent to the front end of the fixing member 33 at a position corresponding to the first clamping slot 321, a plurality of second clamping slots 341 are provided at equal intervals around the stop ring 34, and second clamping blocks 322 are provided on the inner walls on both sides of the connector 32, the second clamping block 322 is clamped in the second clamping slot 341, and a top end of the ferrule 35 protrudes from the top end of the connector 32;

third clamping slots 221 are provided on both sides adjacent to a top end of the connecting tail sleeve 22, the top end of the connecting tail sleeve 22 is inserted into a bottom end of the connecting head sleeve 21, third clamping blocks 211 are provided at a position corresponding to the third clamping slot 221 at the bottom end of the connecting head sleeve 21, a through hole 222 is provided in the middle of the connecting tail sleeve 22, and an optical cable 40 is passed through the through hole 222, an optical cable fixing ring 401 is provided in the optical cable 40 corresponding to the through hole 222, the optical cable 40 passes through the connecting tail sleeve 22, the connecting head sleeve 21 and the fixing member 33 in sequence, and then is connected to a bottom end of the ferrule 35.

Figure 1:
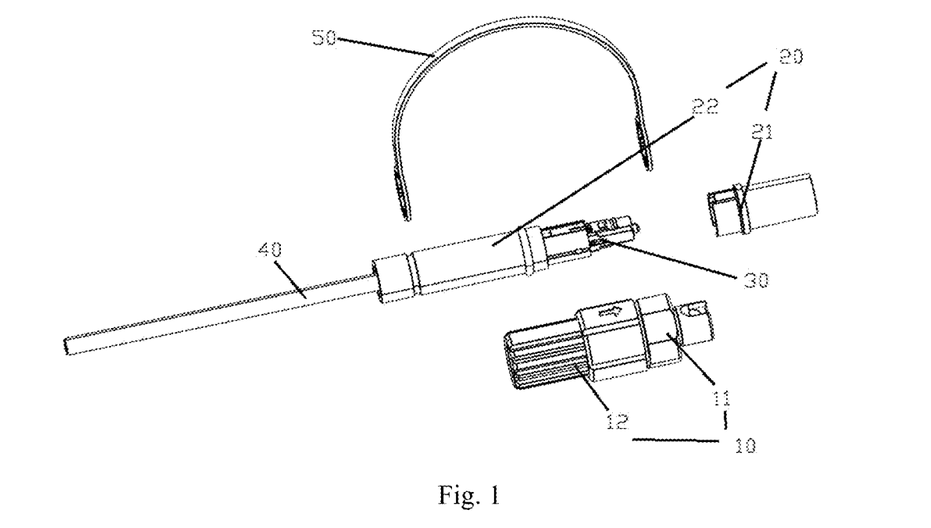
FIG. 1 is a schematic structural diagram of Embodiment 1 of the present disclosure.
Figure 2:
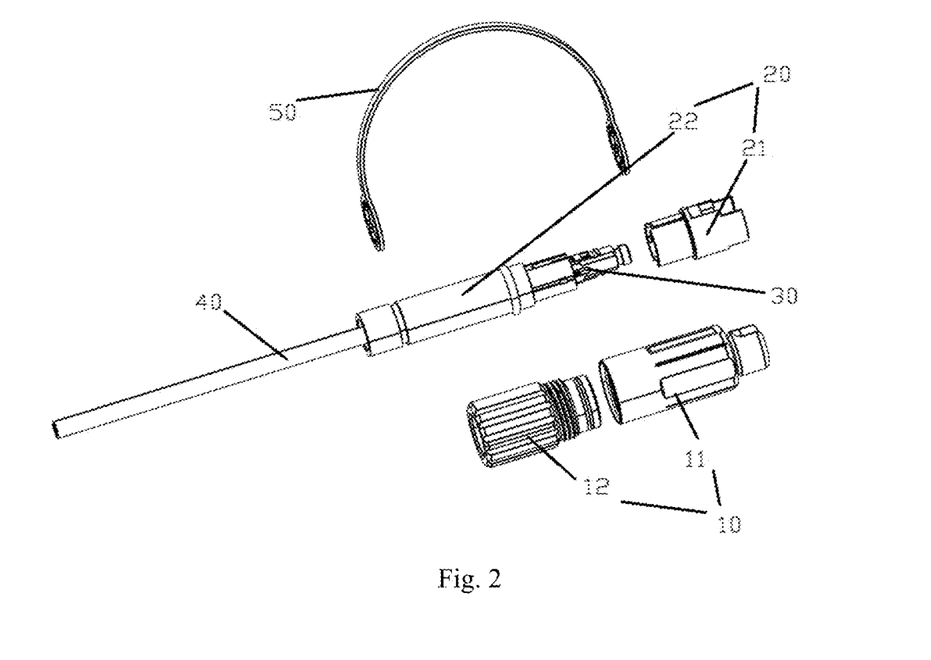
FIG. 2 is a schematic structural diagram of Embodiment 2 of the present disclosure.

Further, in the above scheme, a connecting handle 50 is provided between the dustproof head sleeve 11 and the connecting tail sleeve 22, one end of the connecting handle 50 is connected to a position adjacent to a top end of the dustproof head sleeve 11, the other end of the connecting handle 50 is connected to a position adjacent to a bottom end of the connecting tail sleeve 22, and the dustproof sleeve 10 is connected to a bottom end of the dust head sleeve 11.

Figure 3:
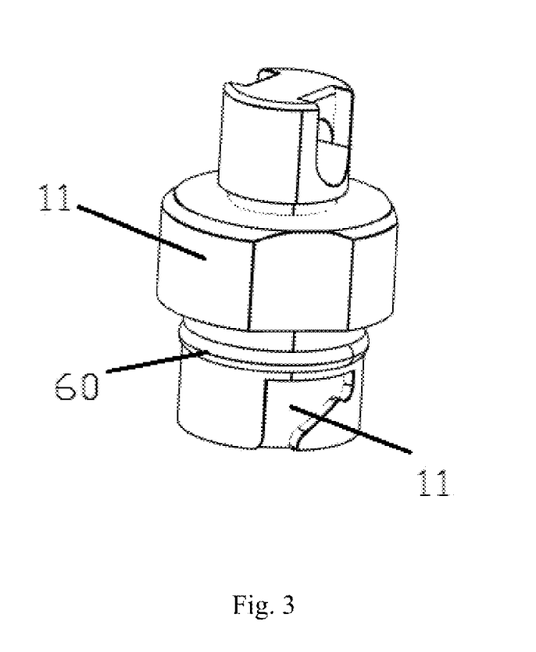
FIG. 3 is a schematic structural diagram of a dustproof head sleeve of the Embodiment 1 of the present disclosure.
Figure 4:
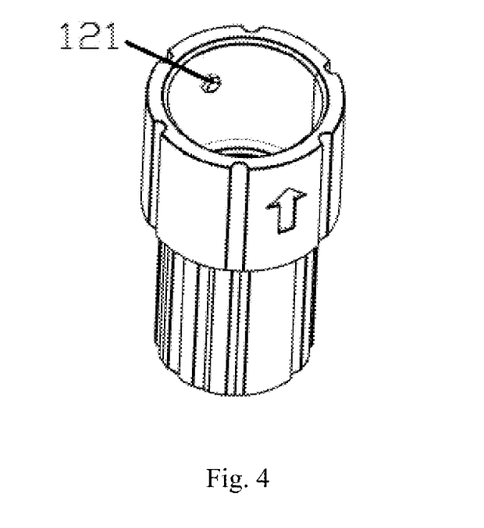
FIG. 4 is a schematic structural diagram of a connecting nut of the Embodiment 1 of the present disclosure.

Further, in the above scheme, an outer end surface adjacent to a bottom end of the dustproof head sleeve 11 is provided with a fourth clamping slot 111, and an inner end surface adjacent to a top end of the connecting nut 12 is provided with a fourth clamping point 121, the fourth clamping point 121 is rotatably clamped in the fourth clamping slot 111, a first sealing ring 60 is provided adjacent to the bottom end of the dustproof head sleeve 11 and corresponding to an upper side of the fourth clamping slot 111.

Figure 5:
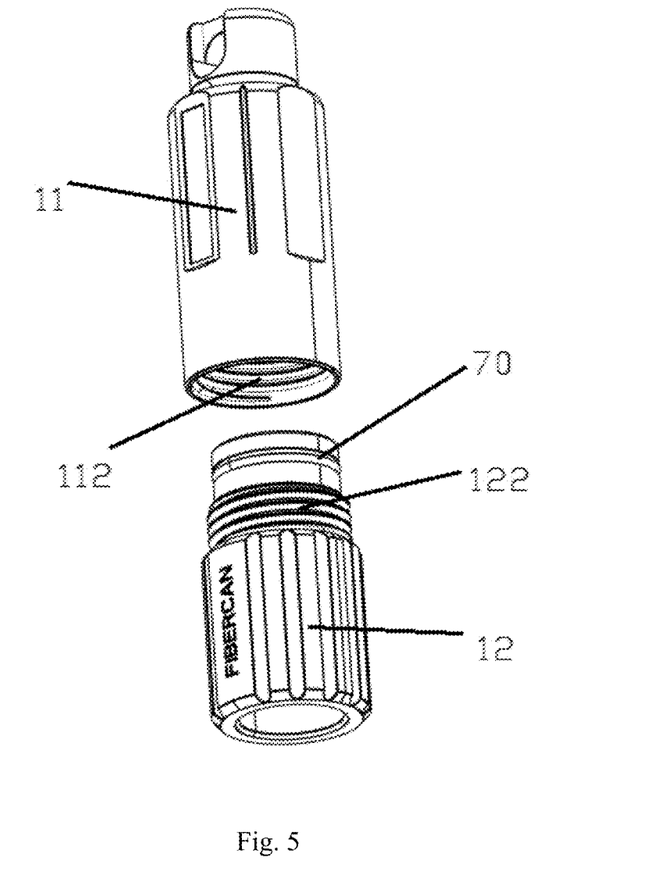
FIG. 5 is a schematic structural diagram of a dustproof sleeve of the Embodiment 2 of the present disclosure.

Further, in the above scheme, an internal thread 112 is provided on the inner end surface adjacent to the bottom end of the dustproof head sleeve 11, and an external thread 122 is provided on the outer end surface adjacent to the top end of the connecting nut 12, the top end of the connecting nut 12 is rotatably fixed to the bottom end of the dustproof head sleeve 11, the external thread 122 at the top end of the connecting nut 12 and the internal thread 112 at the bottom end of the dustproof head sleeve 11 are engaged with each other, and a second sealing ring 70 is provided adjacent to the top end of the connecting nut 12 and corresponding to an upper side of the external thread 122.

Further, in the above scheme, a first groove 223 is provided at a tail end of the connecting tail sleeve 22, a second groove 229 is provided adjacent to a front end of the connecting tail sleeve 22, the second groove 229 is provided with a third sealing ring 80, a mounting groove 224 with the same shape as a bottom end of the fixing member 33 is provided at the front end of the connecting tail sleeve 22, a fifth clamping point 332 is provided on both sides of the fixing member 33, and a fifth clamping slot 225 is provided in the mounting groove 224 at a position corresponding to the fifth clamping point 332.

Further, in the above scheme, the third clamping slots 221 are symmetrically arranged on the outer end surfaces on both sides adjacent to the top end of the connecting tail sleeve 22, a vertical downward opening 226 is provided at the top end of the connecting tail sleeve 22 corresponding to an upper side of the third clamping slot 221, a vertically downward first clamping groove 227 and a second clamping groove 228 are provided at the top end of the connecting tail sleeve 22, the first clamping groove 227 and the second clamping groove 228 are symmetrically arranged on the top end of the connecting tail sleeve 22, and a groove width dimension of the first clamping groove 227 is larger than that of the second clamping groove 228.

Figure 6:
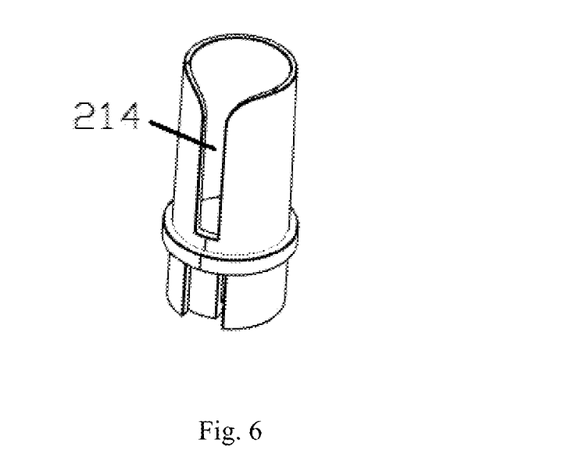
FIG. 6 is a schematic structural diagram of a connecting head sleeve of the Embodiment 1 of the present disclosure.
Figure 8:
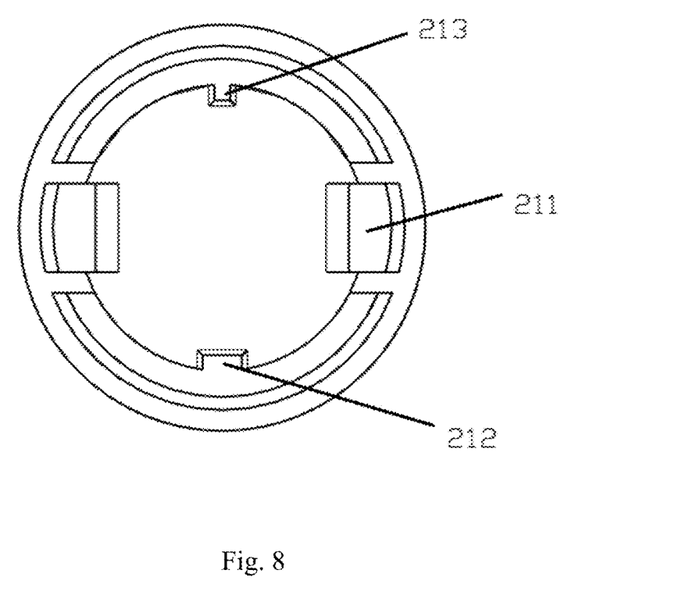
FIG. 8 is a bottom view of a connecting head sleeve of the Embodiment 1 and the Embodiment 2 of the present disclosure.
Figure 9:
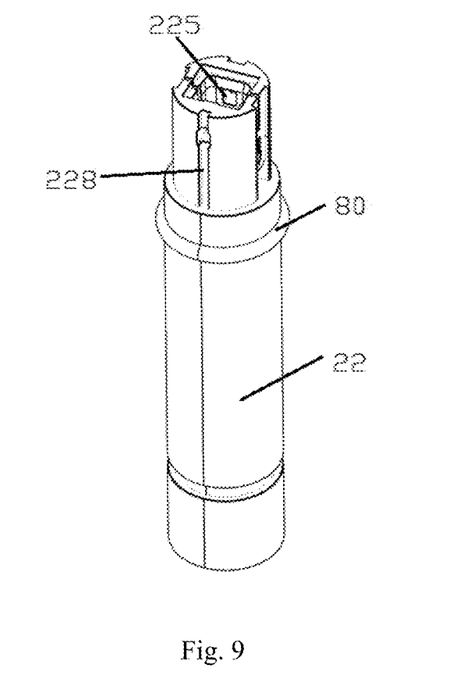
FIG. 9 is a perspective view of a connecting tail sleeve of the present disclosure.
Figure 10:
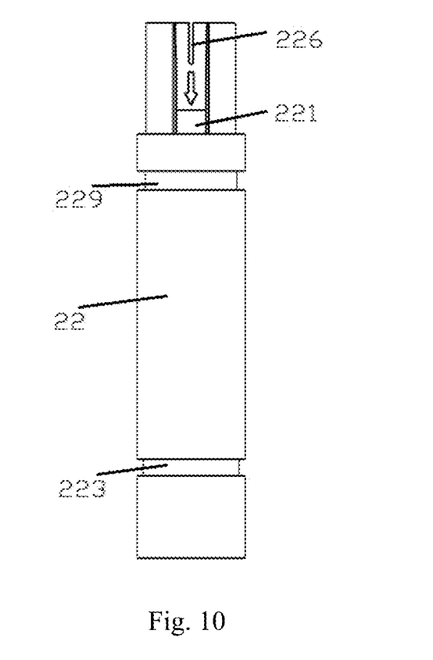
FIG. 10 is a side view of a connecting tail sleeve of the present disclosure.

Further, in the above scheme, the third clamping blocks 211 are symmetrically arranged on both sides of the bottom end of the connecting head sleeve 21, a vertical first limiting block 212 and a vertical second limiting block 213 are provided at positions of an inner end surface of the bottom end of the connecting head sleeve 21 corresponding to the first clamping groove 227 and the second clamping groove 228, a vertically downward opening slot 214 is provided at a top end of the connecting head sleeve 21, and a connection position between two sides of a top end of the opening slot 214 and the top end of the connecting head sleeve 21 is arc-shaped.

Figure 7:
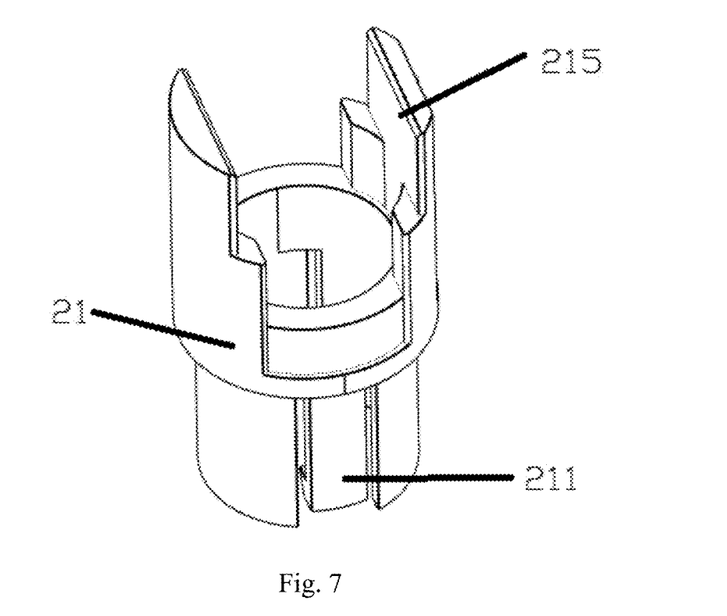
FIG. 7 is a schematic structural diagram of a connecting head sleeve of the Embodiment 2 of the present disclosure.

Further, in the above scheme, the third clamping blocks 211 are symmetrically arranged on both sides of the bottom end of the connecting head sleeve 21, a vertical first limiting block 212 and a vertical second limiting block 213 are provided at positions of an inner end surface of the bottom end of the connecting head sleeve 21 corresponding to the first clamping groove 227 and the second clamping groove 228, and a vertically upward inserting block 215 is provided on a top end of the connecting head sleeve 21.

In terms of structure of the present disclosure, the dustproof sleeve 10 includes a dustproof head sleeve 11 and a connecting nut 12. When not in use, the dustproof head sleeve 11 and the connecting nut 12 can be screwed and fixed to achieve a protective effect. The dustproof sleeve 10 is arranged at the front end of the connecting sleeve 20, and the connecting sleeve 20 includes a connecting head sleeve 21 and a connecting tail sleeve 22, the top end of the connecting tail sleeve 22 is inserted into the bottom end of the connecting head sleeve 21, and both sides of the bottom end of the connecting head sleeve 21 and both sides of the top end of the connecting tail sleeve 22 are clamped together, a connecting component 30 is provided in the middle of the connecting sleeve 20, and the connecting component 30 includes a protective sleeve 31, a connector 32, a fixing member 33, a stop ring 34 and a ferrule 35.

It should be noted that a connecting handle 50 is provided between the dustproof head sleeve 11 and the connecting tail sleeve 22, and one end of the connecting handle 50 is connected at a position adjacent to the top end of the dustproof head sleeve 11, the other end of the connecting handle 50 is connected to the first groove 223 on the connecting tail sleeve 22, and the dustproof head sleeve 11 can be removed during use, thereby being very convenient.

Figure 13:
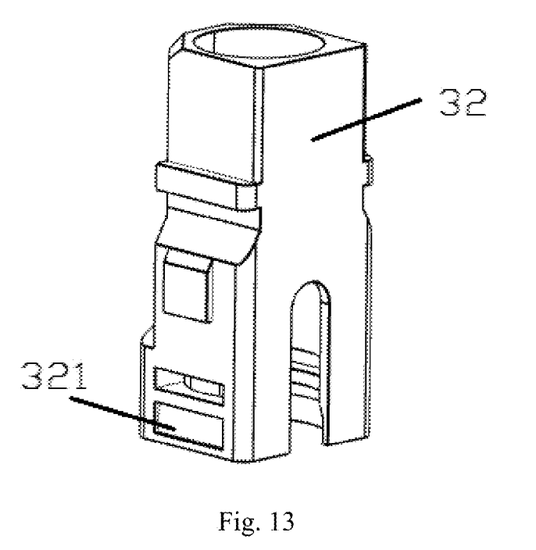
FIG. 13 is a perspective view of a connector of the present disclosure.
Figure 14:
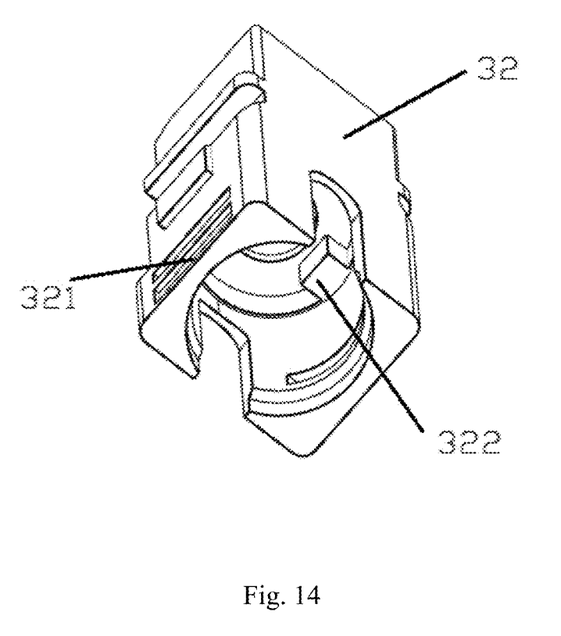
FIG. 14 is a perspective view of a second clamping block of a connector of the present disclosure.
Figure 15:
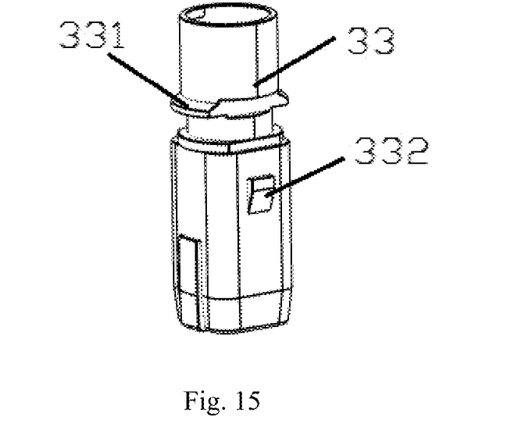
FIG. 15 is a schematic structural diagram of a fixing member of the present disclosure.
Figure 16:
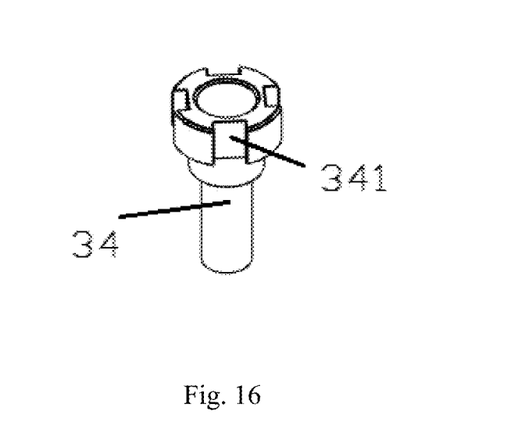
FIG. 16 is a schematic structural diagram of a stop ring of the present disclosure.

It should be noted that the front end of the fixing member 33 is inserted into the bottom end of the connector 32, and first clamping slots 321 are provided at two sides adjacent to the bottom end of the connector 32. First clamping blocks 331 are provided on both sides adjacent to the front end of the fixing member 33 at a position corresponding to the first clamping slot 321, the first clamping block 331 is clamped in the first clamping slot 321 to function as a fixed connection.

It should be noted that the front end of the fixing member 33 is provided with a stop ring 34, the front end of the stop ring 34 is provided with a ferrule 35, the bottom end of the ferrule 35 is inserted into the front end of the stop ring 34, and four second grooves 341 are equally spaced around the stop ring 34, two second clamping blocks 322 are provided on the inner walls on both sides of the connector 32, the second clamping block 322 is clamped in the second clamping slot 341, and the top end of the ferrule 35 protrudes from the top end of the connector 32, the stop ring 34 is provided with 4 second grooves 341 at equal intervals, as a result, the stop ring 34 can be fastened to the second clamping block 322 through any two of the second clamping slots 341 to achieve connection and fixation, thereby achieving a locking effect of preventing rotation.

It should be noted that a spring is provided between the stopper and the fixing member 33, and the bottom end of the spring abuts in the fixing member 33, the top end of the spring abuts against the stopper, and the front end of the stopper abuts in the connector 32 under the force of the spring.

Figure 11:
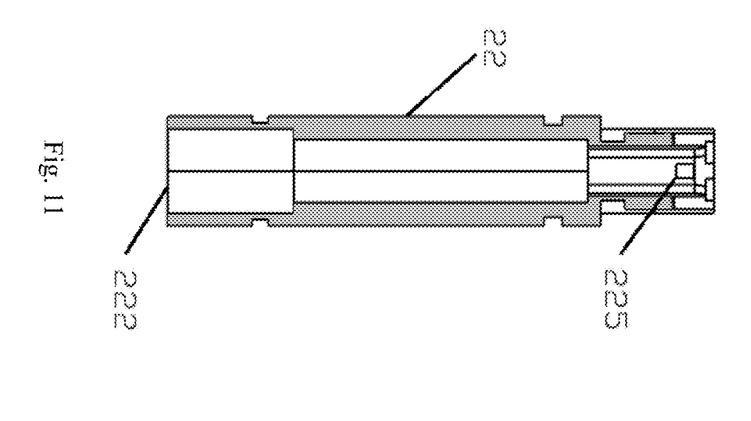
FIG. 11 is a cross-sectional view of a connecting tail sleeve of the present disclosure.
Figure 12:
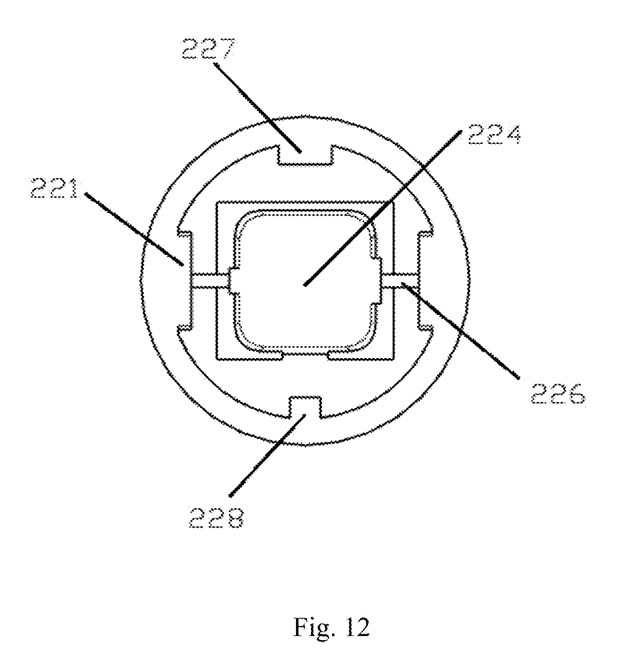
FIG. 12 is a top view of a connecting tail sleeve of the present disclosure.
Figure 17:
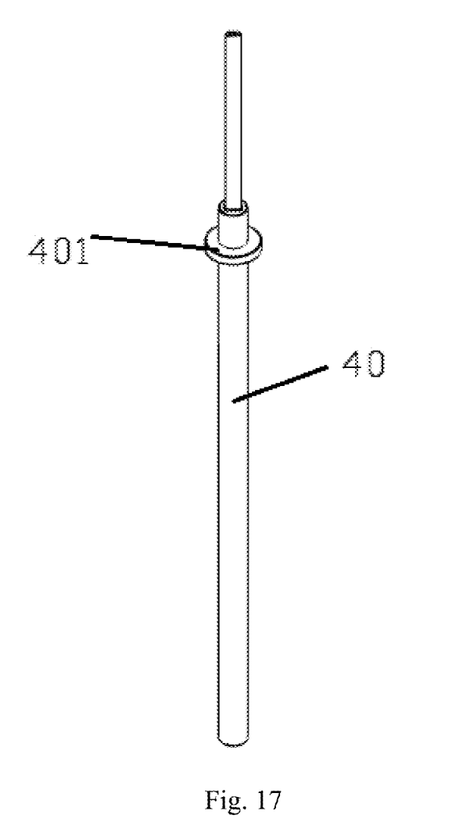
FIG. 17 is a schematic structural diagram of an optical cable of the present disclosure.
Figure 18:
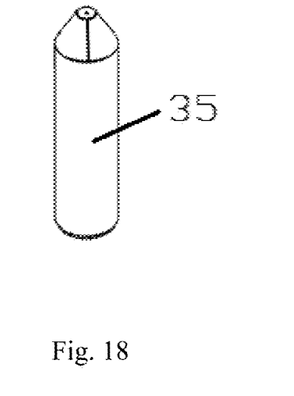
FIG. 18 is a schematic structural diagram of a ferrule of the present disclosure.
Figure 19:
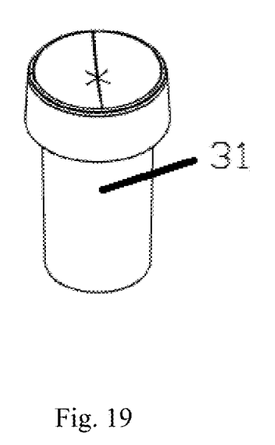
FIG. 19 is a schematic structural diagram of a protective sleeve of the present disclosure.

It should be noted that the connecting tail sleeve 22 is provided with a first chamber and a second chamber, the position where the first chamber and the second chamber are connected is provided with the optical cable fixing ring 401, and according to the cross-sectional shape of the optical cable 40, it may be fixed by the optical cable fixing ring 401 with a circular or square middle through hole.

Embodiment 1

The outer end surface adjacent to the bottom end of the dustproof head sleeve 11 is provided with a fourth clamping slot 111, a fourth clamping point 121 is provided on the inner end surface adjacent to the top end of the connecting nut 12, and the fourth clamping point 121 is rotatably locked in the fourth clamping groove 111 to achieve the effect of rotating and fixing, thereby being very convenient to install and remove the dustproof head sleeve 11, and a first sealing ring 60 is provided adjacent to the bottom end of the dustproof head sleeve 11 and corresponding to the upper side of the fourth clamping slot 111, which can strengthen the sealing performance between the dustproof head sleeve 11 and the connecting nut 12, a second groove 229 is provided adjacent to the front end of the connecting tail sleeve 22, and a third sealing ring 80 is provided in the second groove 229, the sealing performance between the connecting tail sleeve 22 and the connecting nut 12 thereby can be enhanced.

It should be noted that the third clamping blocks 211 are symmetrically arranged on both sides of the bottom end of the connecting head sleeve 21, the inner end surface of the bottom end of the connecting head sleeve 21 is provided with a vertical first limiting block 212 and a second limiting block 213 corresponding to the positions of the first clamping groove 227 and the second clamping groove 228. The groove width of the first clamping groove 227 is greater than the groove width of the second clamping groove 228, so that the first limiting block 212 and the second limiting block 213 are not universal, achieving the effect of fixing the connecting head sleeve 21, a vertically downward opening slot 214 is provided on one side of the top end of the connecting head sleeve 21, and the position at which the two sides of the top end of the opening slot 214 and the top end of the connecting head sleeve 21 are connected is arc-shaped.

Embodiment 2

The inner end surface adjacent to the bottom end of the dustproof head sleeve 11 is provided with an internal thread 112, and the outer end surface adjacent to the top end of the connecting nut 12 is provided with an external thread 122, the top end of the connecting nut 12 is rotatably fixed to the bottom end of the dustproof head sleeve 11, the external thread 122 at the top end of the connecting nut 12 and the internal thread 112 at the bottom end of the dustproof head sleeve 11 engage with each other, a second sealing ring 70 is provided adjacent to the top end of the connecting nut 12 and corresponding to the upper side of the external thread 122, when the dustproof head sleeve 11 and the connecting nut 12 are screwed and fixed, the second sealing ring 70 can enhance the sealing performance.

The third clamping blocks 211 are symmetrically arranged on both sides of the bottom end of the connecting head sleeve 21, the inner end surface of the bottom end of the connecting head sleeve 21 is provided with a vertical first limiting block 212 and a vertical second limiting block 213 corresponding to the positions of the first clamping groove 227 and the second clamping groove 228. The groove width of the first clamping groove 227 is greater than the groove width of the second clamping groove 228, the first limiting block 212 and the second limiting block 213 are not universal, achieving the effect of fixing the installation direction of the connecting head sleeve 21, at the same time, the connecting head sleeve 21 will not rotate and deviate along the circumference, which is more stable, and the top end of the connecting head sleeve 21 is provided with a vertically upward inserting block 215.

It should be noted that, in the present disclosure, the bottom end of the connecting head sleeve 21 in the Embodiment 1 and Embodiment 2 are both fixed on the connecting tail sleeve 22 by plugging, two different connectors can be adapted by replacing the connecting head sleeve 21 in Embodiment 1 and Embodiment 2. In use, different connecting head sleeves 21 can be directly replaced according to different connectors, thereby the connector having better compatibility.

The above are only the preferred embodiments of the present disclosure, it should be pointed out that for those of ordinary skill in the art, without departing from the principle of the present disclosure, several improvements and modifications can be made, and these improvements and modifications should also be regarded as the protection scope of the present disclosure.

What is claimed is:

1. A composite-type outdoor connector, comprising a dustproof sleeve (10) and a connecting sleeve (20), wherein the dustproof sleeve (10) comprises a dustproof head sleeve (11) and a connecting nut (12), the dustproof head sleeve (11) and the connecting nut (12) are screwed and fixed, and the connecting sleeve (20) comprises a connecting head sleeve (21) and a connecting tail sleeve (22), a connecting component (30) is provided in the middle of the connecting sleeve (20), the connecting component (30) comprises a protective sleeve (31), a connector (32), a fixing member (33), a stop ring (34) and a ferrule (35);

wherein the protective sleeve (31) is sleeved on an end of the ferrule (35), the ferrule (35) is inserted at a front end of the stop ring (34), a bottom end of the stop ring (34) is inserted into a front end of the fixing member (33), a front end of the fixing member (33) is inserted into a bottom end of the connector (32), first clamping slots (321) are provided at both sides adjacent to the bottom end of the connector (32), first clamping blocks (331) are provided on both sides adjacent to the front end of the fixing member (33) at a position corresponding to the first clamping slot (321), a plurality of second clamping slots (341) are provided at equal intervals around the stop ring (34), and second clamping blocks (322) are provided on the inner walls on both sides of the connector (32), the second clamping block (322) is clamped in the second clamping slot (341), and a top end of the ferrule (35) protrudes from the top end of the connector (32);

wherein third clamping slots (221) are provided on both sides adjacent to a top end of the connecting tail sleeve (22), the top end of the connecting tail sleeve (22) is inserted into a bottom end of the connecting head sleeve (21), third clamping blocks (211) are provided at a position corresponding to the third clamping slot (221) at the bottom end of the connecting head sleeve (21), a through hole (222) is provided in the middle of the connecting tail sleeve (22), and an optical cable (40) is passed through the through hole (222), an optical cable fixing ring (401) is provided in the optical cable (40) corresponding to the through hole (222), the optical cable (40) passes through the connecting tail sleeve (22), the connecting head sleeve (21) and the fixing member (33) in sequence, and then is connected to a bottom end of the ferrule (35); and wherein an outer end surface adjacent to a bottom end of the dustproof head sleeve (11) is provided with a fourth clamping slot (111), and an inner end surface adjacent to a top end of the connecting nut (12) is provided with a fourth clamping point (121), the fourth clamping point (121) is rotatably clamped in the fourth clamping slot (111), a first sealing ring (60) is provided adjacent to the bottom end of the dustproof head sleeve (11) and corresponding to an upper side of the fourth clamping slot (111).

2. The composite-type outdoor connector of claim 1, wherein, a connecting handle (50) is provided between the dustproof head sleeve (11) and the connecting tail sleeve (22), one end of the connecting handle (50) is connected to a position adjacent to a top end of the dustproof head sleeve (11), the other end of the connecting handle (50) is connected to a position adjacent to a bottom end of the connecting tail sleeve (22), and the dustproof sleeve (10) is connected to a bottom end of the dustproof head sleeve (11).

3. The composite-type outdoor connector of claim 1, wherein, an internal thread (112) is provided on the inner end surface adjacent to the bottom end of the dustproof head sleeve (11), and an external thread (122) is provided on the outer end surface adjacent to the top end of the connecting nut (12), the top end of the connecting nut (12) is rotatably fixed to the bottom end of the dustproof head sleeve (11), the external thread (122) at the top end of the connecting nut (12) and the internal thread (112) at the bottom end of the dustproof head sleeve (11) are engaged with each other, and a second sealing ring (70) is provided adjacent to the top end of the connecting nut (12) and corresponding to an upper side of the external thread (122).

4. The composite-type outdoor connector of claim 1, wherein, a first groove (223) is provided at a tail end of the connecting tail sleeve (22), a second groove (229) is provided adjacent to a front end of the connecting tail sleeve (22), the second groove (229) is provided with a third sealing ring (80), a mounting groove (224) with the same shape as a bottom end of the fixing member (33) is provided at the front end of the connecting tail sleeve (22), a fifth clamping point (332) is provided on both sides of the fixing member (33), and a fifth clamping slot (225) is provided in the mounting groove (224) at a position corresponding to the fifth clamping point (332).

5. The composite-type outdoor connector of claim 1, wherein, the third clamping slots (221) are symmetrically arranged on the outer end surfaces on both sides adjacent to the top end of the connecting tail sleeve (22), a vertical downward opening (226) is provided at the top end of the connecting tail sleeve (22) corresponding to an upper side of the third clamping slot (221), a vertically downward first clamping groove (227) and a second clamping groove (228) are provided at the top end of the connecting tail sleeve (22), the first clamping groove (227) and the second clamping groove (228) are symmetrically arranged on the top end of the connecting tail sleeve (22), and a groove width dimension of the first clamping groove (227) is larger than that of the second clamping groove (228).

6. The composite-type outdoor connector of claim 4, wherein the third clamping blocks (211) are symmetrically arranged on both sides of the bottom end of the connecting head sleeve (21), a vertical first limiting block (212) and a vertical second limiting block (213) are provided at positions of an inner end surface of the bottom end of the connecting head sleeve (21) corresponding to the first clamping groove (227) and the second clamping groove (228), a vertically downward opening slot (214) is provided at a top end of the connecting head sleeve (21), and a connection position between two sides of a top end of the opening slot (214) and the top end of the connecting head sleeve (21) is arc-shaped.

7. The composite-type outdoor connector of claim 4, wherein, the third clamping blocks (211) are symmetrically arranged on both sides of the bottom end of the connecting head sleeve (21), a vertical first limiting block (212) and a vertical second limiting block (213) are provided at positions of an inner end surface of the bottom end of the connecting head sleeve (21) corresponding to the first clamping groove (227) and the second clamping groove (228), and a vertically upward inserting block (215) is provided on a top end of the connecting head sleeve (21).

* * * * *